(12) United States Patent
Ausserlechner

(10) Patent No.: US 10,746,569 B2
(45) Date of Patent: Aug. 18, 2020

(54) MAGNETIC ANGLE SENSOR DEVICE AND METHOD OF OPERATION

(71) Applicant: Infineon Technologies AG, Neubiberg (DE)

(72) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 266 days.

(21) Appl. No.: 15/808,958

(22) Filed: Nov. 10, 2017

(65) Prior Publication Data
US 2018/0172474 A1 Jun. 21, 2018

(30) Foreign Application Priority Data
Dec. 20, 2016 (DE) .................. 10 2016 124 948

(51) Int. Cl.
*G01D 5/14* (2006.01)
*G01D 5/16* (2006.01)
(52) U.S. Cl.
CPC ............. *G01D 5/142* (2013.01); *G01D 5/145* (2013.01); *G01D 5/16* (2013.01)
(58) Field of Classification Search
None
See application file for complete search history.

(56) References Cited

U.S. PATENT DOCUMENTS

2006/0103373 A1* 5/2006 Ricks ................. G01D 5/145
324/207.21
2012/0249133 A1* 10/2012 Friedrich ........... G01R 33/0005
324/247

(Continued)

FOREIGN PATENT DOCUMENTS

CN 1295664 A 5/2001
CN 101180519 A 5/2008

(Continued)

OTHER PUBLICATIONS

Metz et al., "Contactless Angle Measurement Using Four Hall Devices on Single Chip", IEEE International Conference on Solid-State Sensors and Actuators, Chicago, Jun. 16-19, 1997, 4 pages.

(Continued)

*Primary Examiner* — Nasima Monsur
(74) *Attorney, Agent, or Firm* — Harrity & Harrity, LLP

(57) ABSTRACT

A magnetic angle sensing system is suggested comprising first, second, and third magnetic sensing devices, a substrate comprising the first, second and third magnetic sensing devices, wherein the first, seconds and third magnetic sensing devices are each arranged such to be responsive to a magnetic field component that is perpendicular to a main surface of the substrate, wherein each or the first, second and third magnetic sensing devices comprises the same number of magnetic sensing elements, wherein the second magnetic sensing device is arranged on the semiconductor surface rotated by 120° in view of the first magnetic sensing device clockwise around a reference point, wherein the third magnetic sensing device is arranged on the semiconductor surface rotated by 120° in view of the first magnetic sensing device counter-clockwise around the reference point.

20 Claims, 11 Drawing Sheets

(56) References Cited

U.S. PATENT DOCUMENTS

| | | |
|---|---|---|
| 2015/0022192 A1* | 1/2015 | Ausserlechner ....... G01D 5/145 324/207.25 |
| 2015/0077093 A1* | 3/2015 | Saito ........................ G01D 5/12 324/207.13 |
| 2015/0137796 A1 | 5/2015 | Ausserlechner |
| 2015/0137797 A1* | 5/2015 | Ausserlechner ......... G01D 3/08 324/207.2 |
| 2016/0041007 A1 | 2/2016 | Lang et al. |
| 2016/0217894 A1 | 7/2016 | Ausserlechner |
| 2016/0223358 A1 | 8/2016 | Ausserlechner |

FOREIGN PATENT DOCUMENTS

| | | |
|---|---|---|
| CN | 102192703 A | 9/2011 |
| CN | 104457552 A | 3/2015 |
| CN | 104656042 A | 5/2015 |
| CN | 104819687 A | 8/2015 |
| CN | 104976948 A | 10/2015 |
| DE | 102013205313 | 10/2014 |
| DE | 102016100899 A1 | 7/2016 |
| DE | 102015101363 | 8/2016 |

OTHER PUBLICATIONS

Ausserlechner, "A Theory of Magnetic Angle Sensors With Hall Plates and Without Fluxguides", IEEE Progress in Electromagnetics Research B, vol. 49, 77-106, 2013, 30 pages.

* cited by examiner

MAGNETIC ANGLE SENSOR DEVICE AND METHOD OF OPERATION

RELATED APPLICATION

This application claims priority under 35 U.S.C. § 119 to German Patent Application No. 102016124948.3, filed on Dec. 20, 2016, the content of which is incorporated by reference herein in its entirety.

TECHNICAL FIELD

Embodiments of the present disclosure relate to a magnetic angle sensor arrangement that allows determining a rotational position or movement of a shaft.

SUMMARY

A first embodiment relates to a magnetic angle sensing system comprising
- a first magnetic sensing device,
- a second magnetic sensing device,
- a third magnetic sensing device,
- a substrate comprising the first magnetic sensing device, the second magnetic sensing device and the third magnetic sensing device,
- wherein the first magnetic sensing device, the second magnetic sensing device and the third magnetic sensing device are each arranged such to be responsive to a magnetic field component that is perpendicular to a main surface of the substrate,
- wherein each or the first magnetic sensing device, the second magnetic sensing device and the third magnetic sensing device comprises the same number of magnetic sensing elements,
- wherein the second magnetic sensing device is arranged on the semiconductor surface rotated by 120° in view of the first magnetic sensing device clockwise around a reference point,
- wherein the third magnetic sensing device is arranged on the semiconductor surface rotated by 120° in view of the first magnetic sensing device counter-clockwise around the reference point.

A second embodiment relates to an angle sensor detection system
- comprising a plurality of magnetic sensing devices that are arranged on a substrate, wherein each of the magnetic sensing devices is susceptible to sensing a magnetic field component that is perpendicular to the main surface of the substrate,
- wherein the plurality of magnetic sensing devices are arranged on a reading circle at three different and equidistant locations,
- wherein azimuthal coordinates of the magnetic sensing devices differ by 120° from each other,
- comprising a processing unit that is arranged to
- determining a first signal that is proportional to a difference of the magnetic field components provided by the first magnetic sensing device and the second magnetic sensing device,
- determining a second signal that is proportional to a difference of the magnetic field components provided by the second magnetic sensing device and the third magnetic sensing device,
- determining a rotation angle based on the first signal and the second signal.

A third embodiment relates to a method for determining a rotation angle of a shaft,
- wherein the shaft is arranged rotatably around a rotation axis and wherein a magnetic field source is connected to the shaft,
- comprising a plurality of magnetic sensing devices that are arranged on a substrate, wherein each of the magnetic sensing devices is susceptible to sensing a magnetic field component of the magnetic field source that is perpendicular to the main surface of the substrate,
- wherein the plurality of magnetic sensing devices are arranged on a reading circle at three different and equidistant locations,
- wherein azimuthal coordinates of the magnetic sensing devices differ by 120° from each other,
- the method comprising the steps:
- determining a first signal that is proportional to a difference of the magnetic field components provided by the first magnetic sensing device and the second magnetic sensing device,
- determining a second signal that is proportional to a difference of the magnetic field components provided by the second magnetic sensing device and the third magnetic sensing device,
- determining a rotation angle based on the first signal and the second signal.

A fourth embodiment is directed to a computer program product directly loadable into a memory of a digital processing device, comprising software code portions for performing the steps of the method as described herein.

A fifth embodiment is directed to a computer-readable medium having computer-executable instructions adapted to cause a computer system to perform the steps of the method as described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF THE PREFERRED EMBODIMENTS

Examples described herein in particular refer to magnetic angle sensors, where a permanent magnet is attached to a rotatable shaft and a magnetic field sensor is placed on the rotation axis and adjacent to the magnet. The magnetic angle sensor detects the rotatable magnetic field, which points in an axial direction, and therefrom it infers the rotational position of the shaft. The magnet can be magnetized homogeneously in diametrical direction, but it can also be magnetized inhomogeneously, e.g., in arc-shape or half of the magnet can be magnetized in axial direction and the other half of the magnet can be magnetized in opposite direction. The magnet may also comprise several disjoint parts glued together or it may be assembled otherwise.

Figure 1:
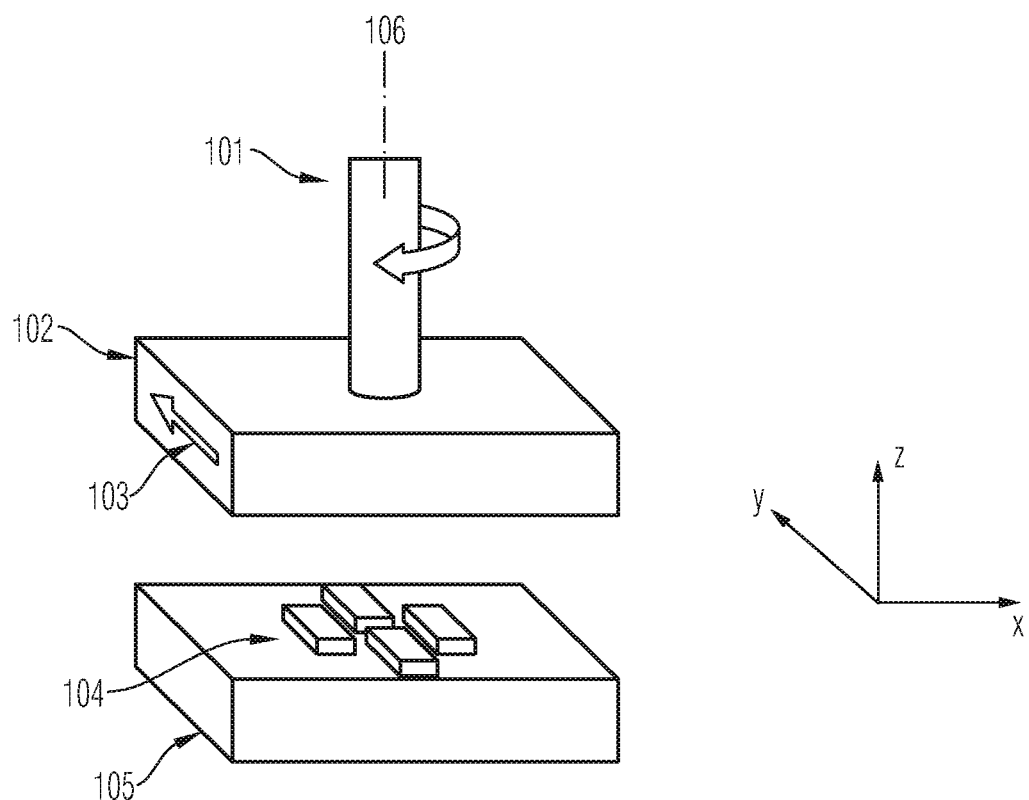
FIG. 1 shows an example arrangement of an angle sensor device that determines an angle of a shaft, wherein the angle may be used to determine a movement and/or position of the shaft.

FIG. 1 shows an example arrangement. A shaft 101 is arranged rotatable around a rotation axis 106. A magnet 102, e.g., a permanent magnet, is connected, e.g., fixed, to the shaft 101. The magnet 102 shows a diametrical magnetization 103. A silicon die 105 comprising several magnetic field sensors 104 is arranged in the vicinity of the magnet 102, in this example below the magnet 102. Each magnetic field sensor may also be referred to as sensing element.

A z-component is referred to as a component parallel to the rotation axis of the shaft (or along the shaft itself), an x-y-plane is perpendicular to the rotation axis of the shaft. The x-y-z-components span a Cartesian coordinate system.

Hence, the rotation axis 106 is parallel to the z-axis and the magnetic field sensors 104 are arranged in the x-y-plane. An axial magnetic field sensor 104 is in particular responsive to a z-component of a magnetic field emitted by the magnet 102.

Various sensors can be used, e.g., an anisotropic magneto-resistor (AMR), a giant magneto-resistor (GMR), a tunneling magneto-resistor (TMR), Hall-effect devices (e.g., Hall plates, vertical Hall-effect devices) or MAG-FETs (e.g., split-drain MAG-FETs).

Examples referred to herein in particular reference magnetic field sensors that detect the z-component of the magnetic field. Hence, the magnetic field sensor may comprise a Hall plate (also referred to as Hall) and/or a MAG-FET with a y-z-plane sensitive to the magnetic field to be determined.

An example contactless angle measurement device using four Hall devices on a single chip is described in [M. Metz, et al.: Contactless Angle Measurement Using Four Hall Devices on Single Chip, 1997 International Conference on Solid-State Sensors and Actuators, Chicago, Jun. 16-19, 1997, IEEE].

Example layouts of axial angle sensors are disclosed in [U. Ausserlechner: A theory of magnetic angle sensors with hall plates and without fluxguides, Progress In Electromagnetics Research B, Vol. 49, 77-106, 2013]. An axialC4 angle sensor is composed of four Hall plates evenly spaced at a Hall circle with a radius R0 around the rotation axis. An axialC8 angle sensor consists of two axialC4 cells rotated 45±against each other. The output of the axialC8 angle sensor is the average of the outputs of both axialC4 cells. The axialC8 angle sensor is more accurate and works with more general shapes of magnets than the axialC4 angle sensor.

Such axial C8 angle sensor, however, faces the problem that it needs a large number of eight sensing elements and all these sensing elements need to be supplied and tapped with supply lines and signal lines, which are periodically exchanged according to a spinning current scheme in order to cancel out offset errors. This requires a significant amount of MOS switches and leads to a considerable amount of chip space which furthers parasitic capacitances, inductances and resistances thereby consuming a considerable amount of additional electrical power.

Examples provided herein provide a more efficient approach, in particular a layout and an algorithm to determine the rotation angle with high accuracy requiring a reduced number of sensing elements (i.e. magnetic field sensors).

Advantageously, the solution presented herein is robust against magnetic disturbance fields. The rotation angle can be derived from differences of magnetic fields at various locations and these differences may in particular reduce or cancel out homogeneous disturbances.

According to an embodiment, three magnetic sensing devices for sensing the z-component of a magnetic field (which is the component that is perpendicular to the main surface of the chip which comprises the sensing elements) are located or placed on a reading circle of a radius R0 which is (substantially) concentric to the rotation axis. Test points of neighboring magnetic sensing devices are spaced apart by 120°.

Each magnetic sensing device may comprise at least one magnetic sensing element. The magnetic sensing devices determining the z-component of the magnetic field is referred to as magnetic sensing system ("system").

It is an advantage that the magnetic sensing system uses three magnetic sensing devices, e.g., all arranged on the reading circle and separated from one another by (substantially) 120°. The three magnetic sensing devices can be used to reconstruct the rotation angle of the shaft from the measured magnetic Bz-fields that are determined by the respective magnetic sensing devices (see algorithm described below).

In an example scenario, the three magnetic sensing devices have parallel main axes, i.e. the magnetic sensing devices have the same orientation in the x-y-plane without being rotated around the z-axis. This is beneficial, because Hall plates offer particularly low offset if the current flows in the <100>-directions of the silicon crystal.

The figures partially show cross-shaped Hall plates. However, any other shape like, e.g., octagons, circular discs or squares with mid-contacts or end-contacts work accordingly. The cross shaped Hall plate indicates current flow directions along one of the two crossed directions.

Figure 2:
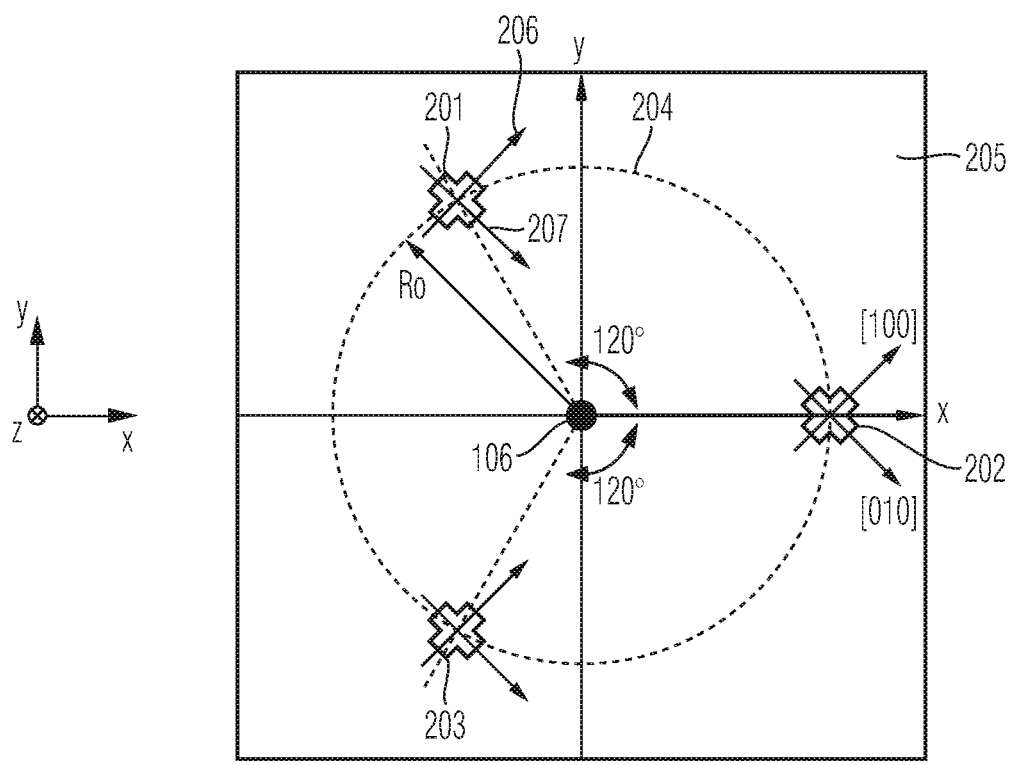
FIG. 2 shows an example arrangement of three magnetic sensing devices that are located on a so-called reading circle that is arranged concentrically at a radius R0 around the rotation axis.

FIG. 2 shows an example arrangement of three magnetic sensing devices 201 to 203 that are located on a so-called reading circle 204 that is arranged concentrically at a radius R0 around the rotation axis z 106. The magnetic sensing devices 201 to 203 are placed on a silicon die 205 with a surface that lies in the x-y-plane. The x-, y- and x-axis span a Cartesian coordinate system.

In the example according to FIG. 2, each of the magnetic sensing devices 201 to 203 comprises a single magnetic sensing element, which is depicted as a cross with two directions 206 and 207 that indicate possible current flow directions of each magnetic sensing device. Between two of the magnetic sensing devices 201 to 203 there is a 120° angle in view of the rotation axis z. Hence, the magnetic sensing devices 201 to 203 are equally distributed on the reading circle 204. Each of the magnetic sensing devices 201 to 203 is susceptible of sensing the magnetic field component Bz (z-direction of the magnetic field component).

The silicon die 205 may correspond to the silicon die 105 of FIG. 1. Hence, the silicon die 205 may be arranged in the vicinity (e.g., below) the magnet 102 such that the rotation of the axis 101 (i.e. position or rotation angle) can be determined via the signals supplied by the magnetic sensing devices 201 to 203. The silicon die 205 is preferably (100)-silicon.

Figure 3:
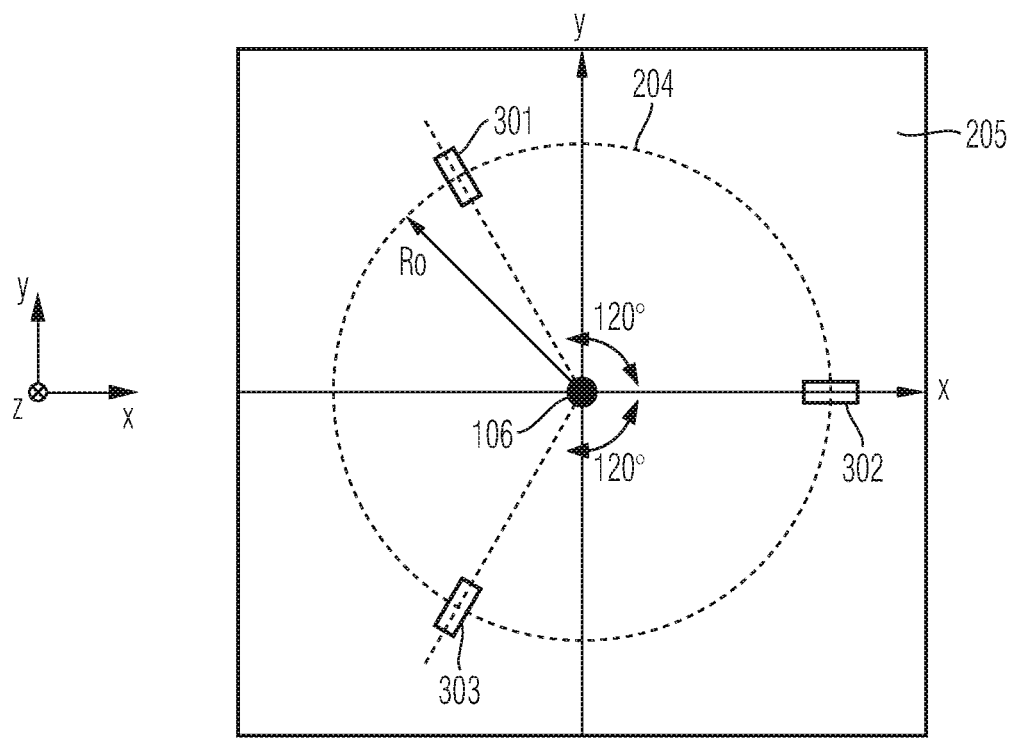
FIG. 3 shows an example arrangement based on FIG. 2, wherein each of the magnetic sensing devices comprises a rectangular Hall-plate.

FIG. 3 shows an alternative arrangement comprising three magnetic sensing devices 301 to 303 that are located on the reading circle 204 that is arranged concentrically at the radius R0 around the rotation axis z 106. The magnetic sensing devices 301 to 303 are placed on the silicon die 205. The magnetic sensing devices 301 to 303 are equally distributed on the reading circle 204.

Each of the magnetic sensing devices 301 to 303 comprises a rectangular Hall-plate to indicate the relative orientation. In this regard the magnetic sensing device 301 is rotated by 120° against the magnetic sensing device 302 and the magnetic sensing device 303 is rotated by 240° against the magnetic sensing device 302.

It is noted that the magnetic sensing device may have a rectangular, quadratic, crosswise, round, octagonal or clover-leave shape. Also, further equivalent shapes may be used. Such equivalent shapes can be reached via conformal mapping. The equivalent shapes have the same electrical properties (in particular regarding a first-order approximation, i.e. without piezo effects or temperature dependent voltage effects).

The magnetic sensing device may in particular be a Hall-plate, which has four electrical contacts, wherein a first set of two electrical contacts are arranged on a first straight line and a second set of two electrical contacts are arranged on a second straight line, wherein the first straight line and the second straight line are perpendicular to each other. Hence a current can be applied to the first straight line and across the second straight line an output voltage can be tapped.

It is noted that the size of the chip (i.e. the silicon die 205) may be in the order of a few millimeter and the radius R0 may range, e.g., from 0.5 mm to 2 mm. A preferable size of the radius R0 may be 0.8 mm. Each of the magnetic field sensing elements (which are part of each magnetic sensing device) may have a size that ranges from 20 µm to 200 µm, which may be ¹⁄₁₀-th of the radius R0. A preferable size of the magnetic sensing element may be 80 µm.

It is beneficial to place the respective magnetic sensing elements at a predefined symmetry or pattern to ensure that they sample the magnetic field equidistantly at integer multiples of 120° and at (substantially) the same reading radius.

In several embodiments, an arrangement of two or more (in particular four) magnetic sensing elements, e.g., Hall-plates, may be arranged instead of only a single magnetic sensing element. In this case, each magnetic sensing device may comprise at least two magnetic sensing elements.

It is an option to connect the magnetic sensing elements of a magnetic sensing device electrically in parallel, i.e. their inputs and their outputs such that the input and output resistances of a quadruple (i.e. four magnetic sensing elements per magnetic sensing device) are four times smaller than the input and output resistances of a magnetic sensing device with a single magnetic sensing element. Hence, the current flow directions in the four magnetic sensing elements of a quadruple are along the directions ψ0, ψ0+90°, ψ0+180°, ψ0+270° (with an arbitrary angle ψ0), wherein an offset (=zero point) error of the quadruple is on average smaller than an offset error resulting from using only a single magnetic sensing element per magnetic sensing device.

Figure 4:
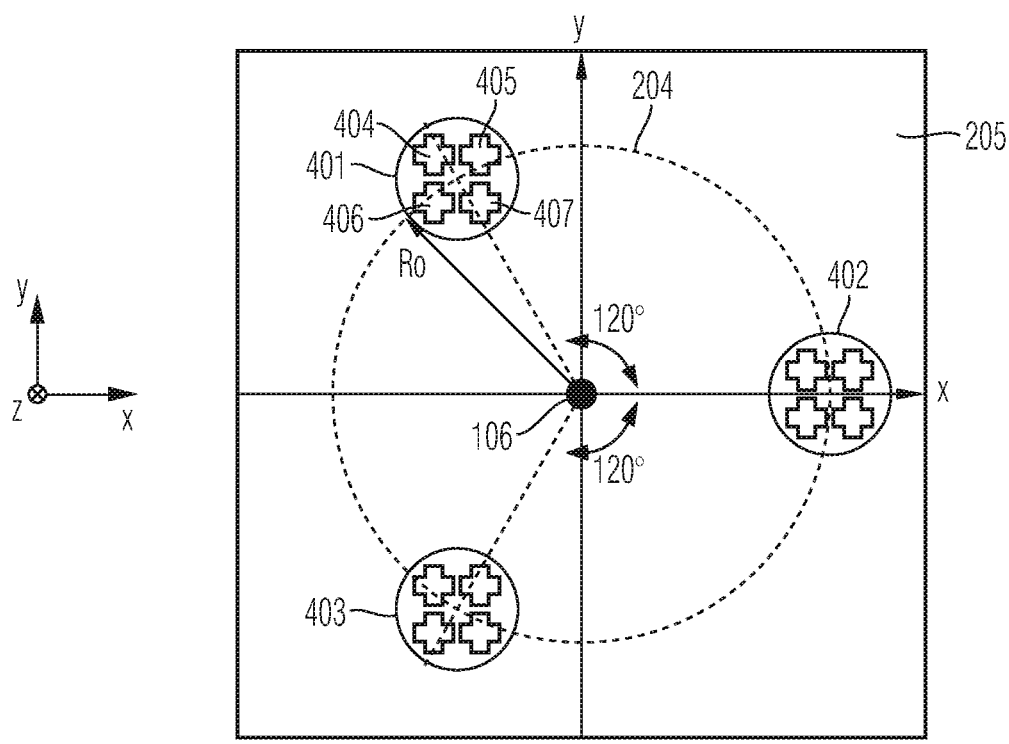
FIG. 4 shows an example arrangement of three magnetic sensing devices that are located on the reading circle, wherein each of the magnetic sensing devices comprises four magnetic sensing elements that are arranged in a rectangular pattern.

FIG. 4 shows an alternative arrangement comprising three magnetic sensing devices 401 to 403 that are located on the reading circle 204. The magnetic sensing devices 401 to 403 are placed on the silicon die 205. The centers of gravity of the magnetic sensing devices 401 to 403 are equally distributed on the reading circle 204. The magnetic sensing device 401 is rotated by 120° against the magnetic sensing device 402 and the magnetic sensing device 403 is rotated by 240° against the magnetic sensing device 402.

Each of the magnetic sensing devices 401 to 403 comprises four magnetic sensing elements. For example, the magnetic sensing device 401 comprises the magnetic sensing elements 404 to 407, which are arranged such that their combined center of gravity lies on the reading circle 204.

In the example shown in FIG. 4, the magnetic sensing elements 404 to 407 show reading directions (that indicate possible current flow directions), which are in parallel to the x-axis and the y-axis (per magnetic sensing element). This applies for the magnetic sensing elements of the magnetic sensing devices 402 and 403 accordingly. The arrangements of magnetic sensing elements within the respective magnetic sensing device 401 to 403 are substantially identical, i.e. the magnetic sensing devices 401 to 403 can be mapped to each other by a translation without rotation.

Figure 5:
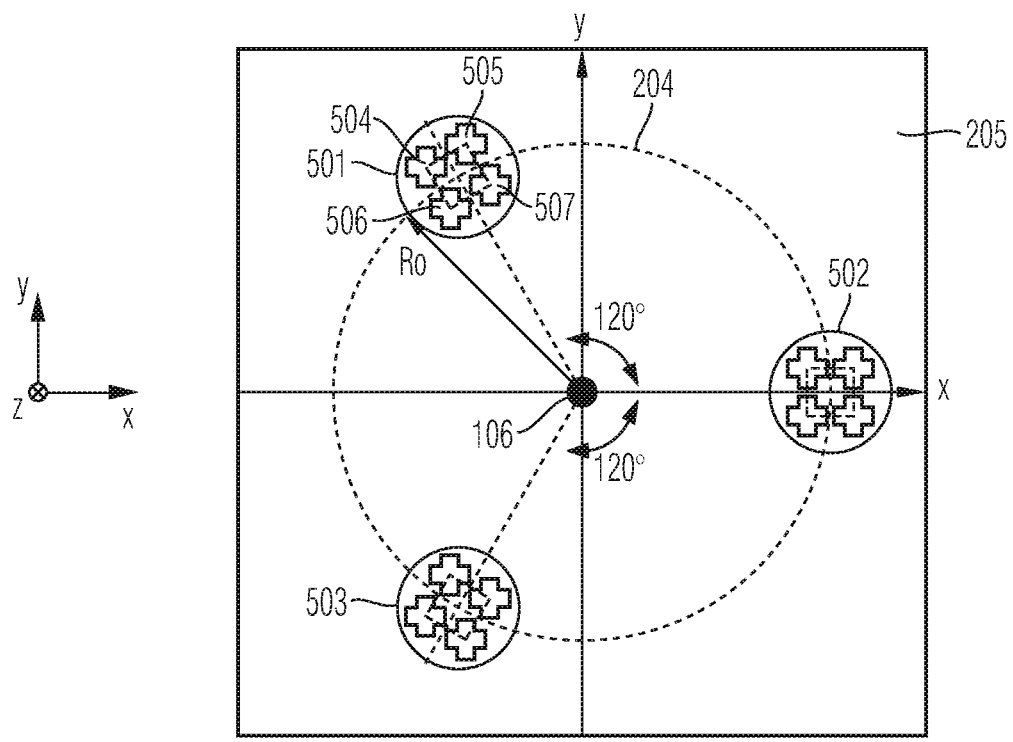
FIG. 5 shows an alternative arrangement compared to the one shown in FIG. 4, wherein the positioning of the magnetic sensing elements is varied based on a rotation of a square, wherein the corners of the square are associated with the positions of the magnetic sensing elements.

FIG. 5 shows an alternative arrangement comprising three magnetic sensing devices 501 to 503 with their centers of gravity located on the reading circle 204. The magnetic sensing devices 501 to 503 are placed on the silicon die 205. The centers of gravity of the magnetic sensing devices 501 to 503 are equally distributed on the reading circle 204.

Each of the magnetic sensing devices 501 to 503 comprises four magnetic sensing elements. For example, the magnetic sensing device 501 comprises the magnetic sensing elements 504 to 507, wherein the centers of gravity of the respective sensing elements 504 to 507 lie on the corners of a square and wherein the center of gravity of this square lies on the reading circle 204. In contrast to the embodiment shown in FIG. 4, the squares of FIG. 5 are rotated, i.e. the square of the magnetic sensor device 501 is rotated by 120° against the square of the magnetic sensor device 502 and the square of the magnetic sensor device 503 is rotated by 240° against the square of the magnetic sensor device 502.

The magnetic sensing elements 504 to 507, however, show reading directions (that indicate possible current flow directions), which are in parallel to the x-axis and the y-axis (per magnetic sensing element). This applies for the magnetic sensing elements of the magnetic sensing devices 502 and 503 accordingly.

Figure 6:
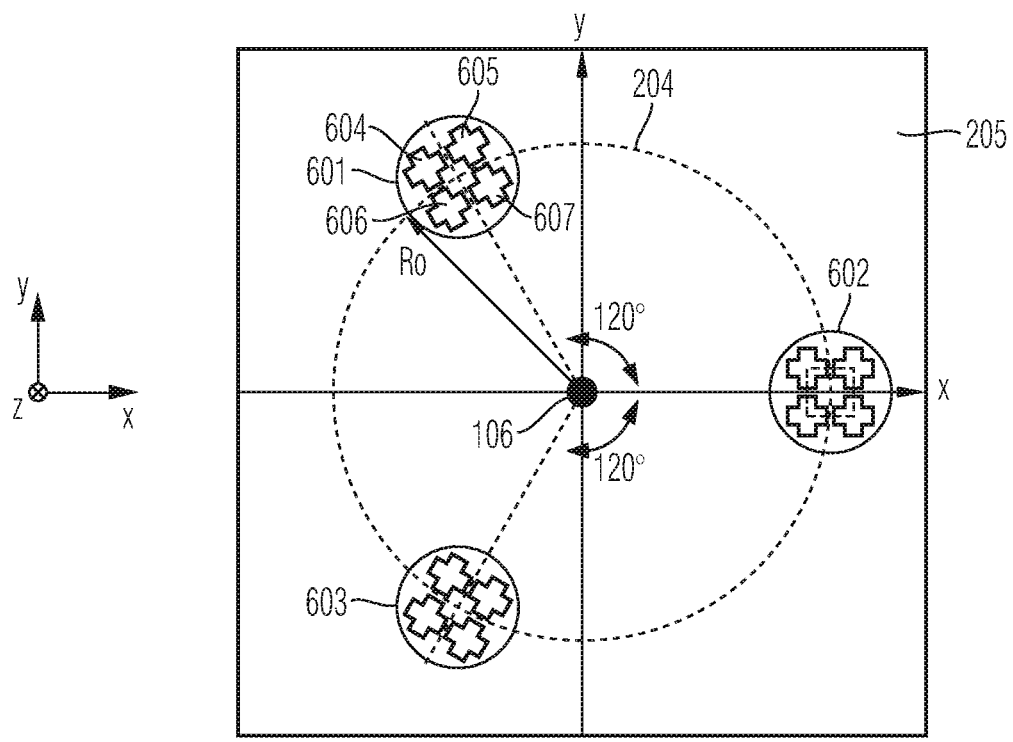
FIG. 6 shows an alternative arrangement compared to the one shown in FIG. 4, wherein the magnetic sensing elements of each magnetic sensing device are rotated together with the position of the magnetic sensing device.

FIG. 6 shows an alternative arrangement comprising three magnetic sensing devices 601 to 603 with their centers of gravity located on the reading circle 204. The magnetic sensing devices 601 to 603 are placed on the silicon die 205. The centers of gravity of the magnetic sensing devices 601 to 603 are equally distributed on the reading circle 204.

Each of the magnetic sensing devices 601 to 603 comprises four magnetic sensing elements. For example, the magnetic sensing device 601 comprises the magnetic sensing elements 604 to 607, wherein the centers of gravity of the sensing elements 604 to 607 lie on the corners of a square and wherein the center of gravity of this square lies on the reading circle 204. The square of the magnetic sensor device 601 is rotated by 120° against the square of the magnetic sensor device 602 and the square of the magnetic sensor device 603 is rotated by 240° against the square of the magnetic sensor device 602.

The magnetic sensing elements sitting on the corners of the squares are also rotated by the same amount as the square itself. This applies for the magnetic sensor elements of the magnetic sensor devices 601 to 603 accordingly.

In the embodiments shown in FIG. 4, FIG. 5, and FIG. 6, each magnetic sensor device comprises four magnetic sensing elements that are arranged on the corners of a square, wherein the corner of the square corresponds to the center of gravity of the respective magnetic sensor element. It is also an option that the four magnetic sensor elements of a magnetic sensor device are arranged substantially on a straight line (tangentially on the reading circle 204) or on the reading circle 204. This will be illustrated hereinafter.

Figure 7:
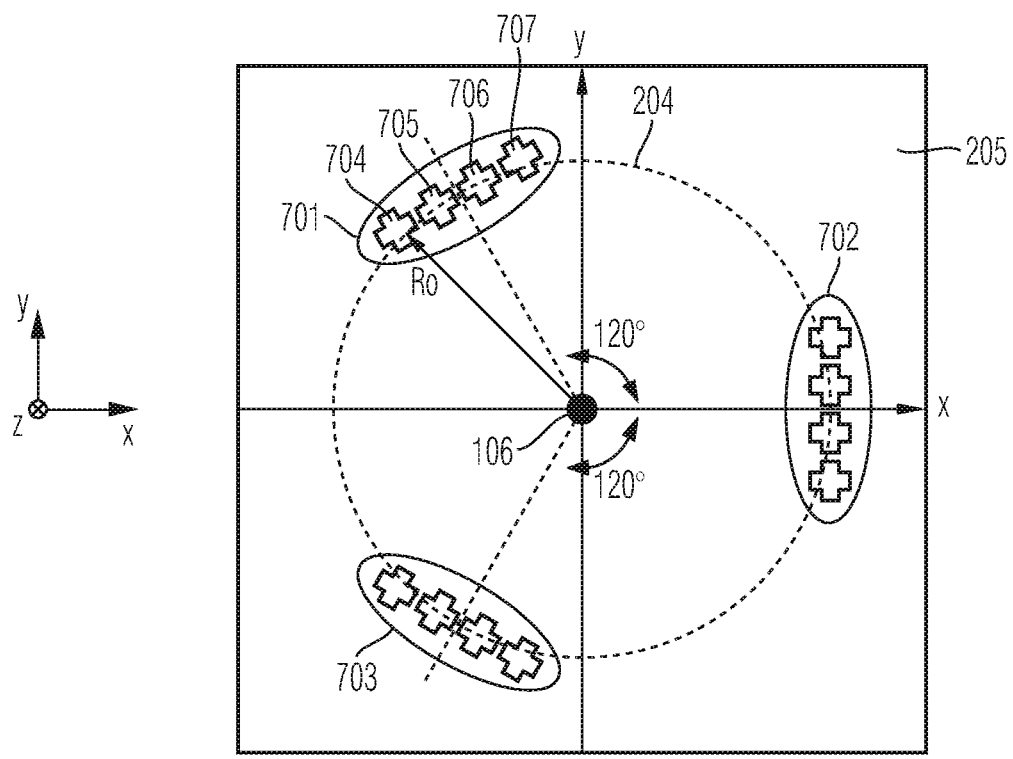
FIG. 7 shows an example arrangement of three magnetic sensing devices that are located on the reading circle, wherein each of the magnetic sensing devices comprises four magnetic sensing elements that are arranged on a straight line substantially tangentially on the reading circle.

FIG. 7 shows an arrangement comprising three magnetic sensing devices 701 to 703, wherein each magnetic sensing device comprises four magnetic sensing elements that are arranged on a straight line. This straight line is arranged tangentially on the reading circle 204 such that the center of gravity of the respective magnetic sensing device 701 to 703 (or the middle of the four magnetic sensor elements) touches the reading circle 204.

The magnetic sensing devices 701 to 703 are placed on the silicon die 205. The centers of gravity of the magnetic sensing devices 701 to 703 are equally distributed on the reading circle 204.

The magnetic sensing device 701 comprises the magnetic sensing elements 704 to 707, wherein the centers of the magnetic sensing elements 704 to 707 are arranged on a straight line and the magnetic sensing elements 704 to 707 have the same orientation (rotation). This applies accordingly for each set of magnetic sensor elements per magnetic sensor device 702 and 703.

The magnetic sensor elements 704 to 707 of the magnetic sensor device 701 are rotated by 120° against the magnetic sensor elements of the magnetic sensor device 702 and the magnetic sensor elements of the magnetic sensor device 703 are rotated by 240° against the magnetic sensor elements of the magnetic sensor device 702.

Figure 8:
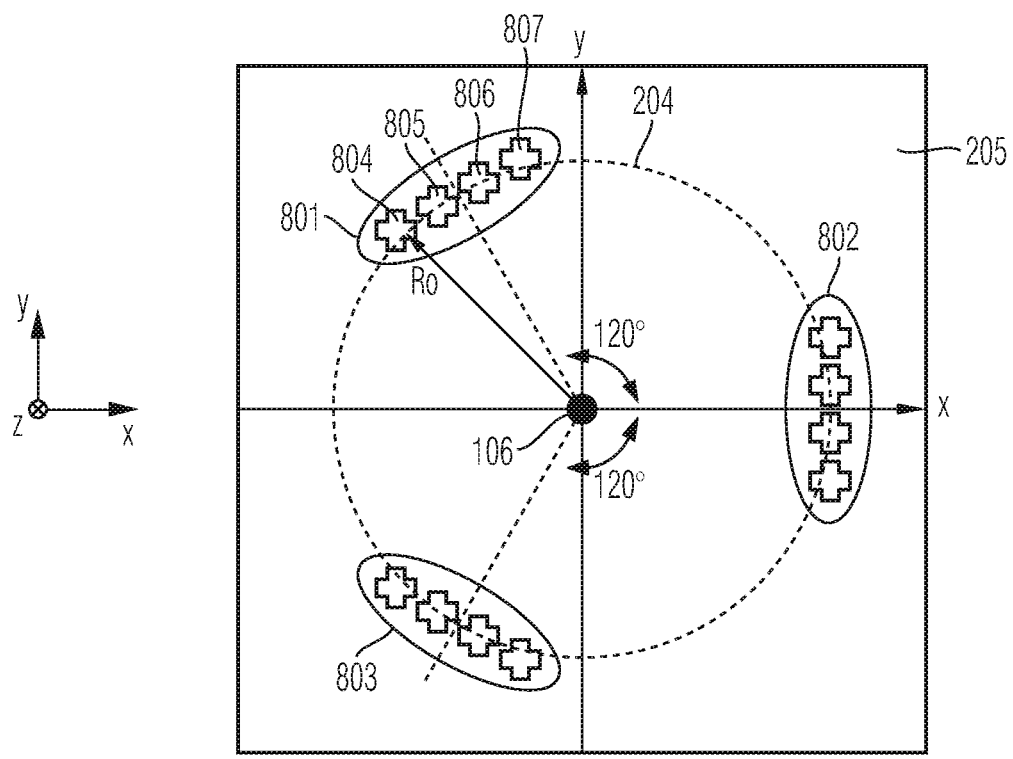
FIG. 8 shows an alternative arrangement compared to the one shown in FIG. 7, wherein the magnetic sensing elements of all magnetic sensing devices have the same orientation (and rotation)

FIG. 8 shows an arrangement comprising three magnetic sensing devices 801 to 803, wherein each magnetic sensing device comprises four magnetic sensing elements that are arranged on a straight line. This straight line is arranged tangentially on the reading circle 204 such that the center of gravity of the respective magnetic sensing device 801 to 803 (or the middle of the four magnetic sensor elements) touches the reading circle 204.

The magnetic sensing devices 801 to 803 are placed on the silicon die 205. The centers of gravity of the magnetic sensing devices 801 to 803 are equally distributed on the reading circle 204.

The magnetic sensing device 801 comprises the magnetic sensing elements 804 to 807, wherein the centers of the magnetic sensing elements 804 to 807 are arranged on a straight line and the magnetic sensing elements 804 to 807 have the same orientation (rotation). In contrast to the embodiment shown in FIG. 7, the magnetic sensing elements of all magnetic sensing devices 801 to 803 have the same orientation and do not show any rotation. In the example of FIG. 8, the reading directions (that indicate possible current flow directions) of all magnetic sensing elements are in parallel to the x-axis and the y-axis.

Figure 9:
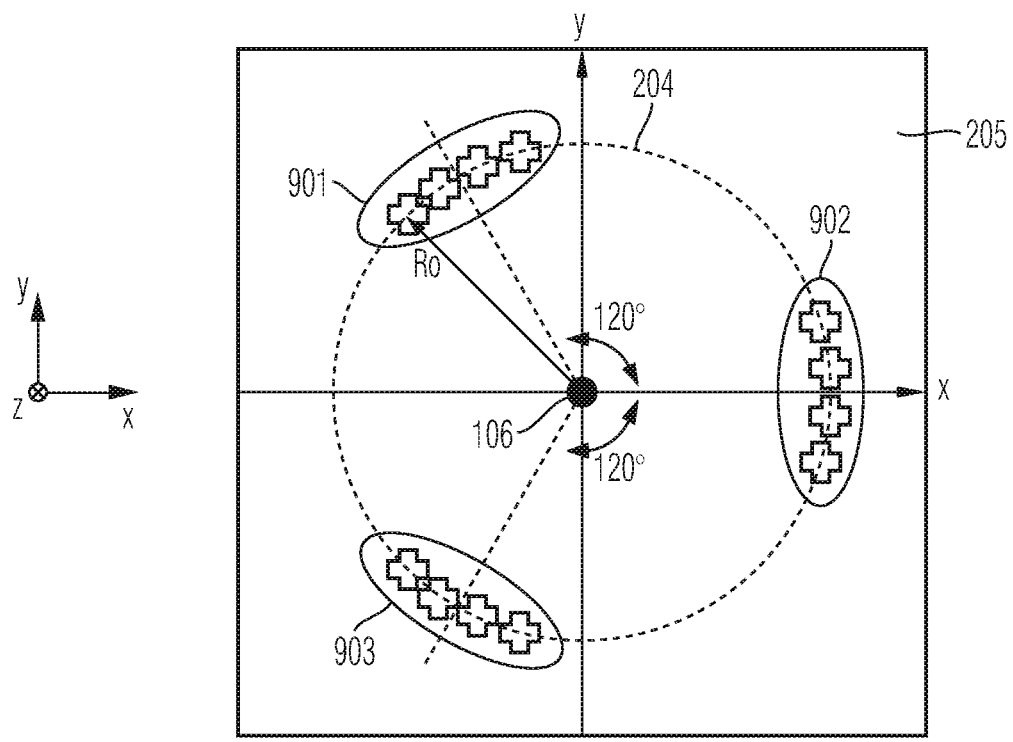
FIG. 9 shows an example arrangement of three magnetic sensing devices that are located on the reading circle, wherein each of the magnetic sensing devices comprises four magnetic sensing elements that are arranged substantially on the reading circle.

FIG. 9 shows an arrangement comprising three magnetic sensing devices 901 to 903, wherein each magnetic sensing device comprises four magnetic sensing elements. In contrast to the embodiment shown in FIG. 8, the four magnetic sensing elements of each magnetic sensing device are not arranged on a straight line, but on the reading circle 204. In particular, the centers of gravity of the magnetic sensing elements are arranged on the reading circle 204.

Figure 10:
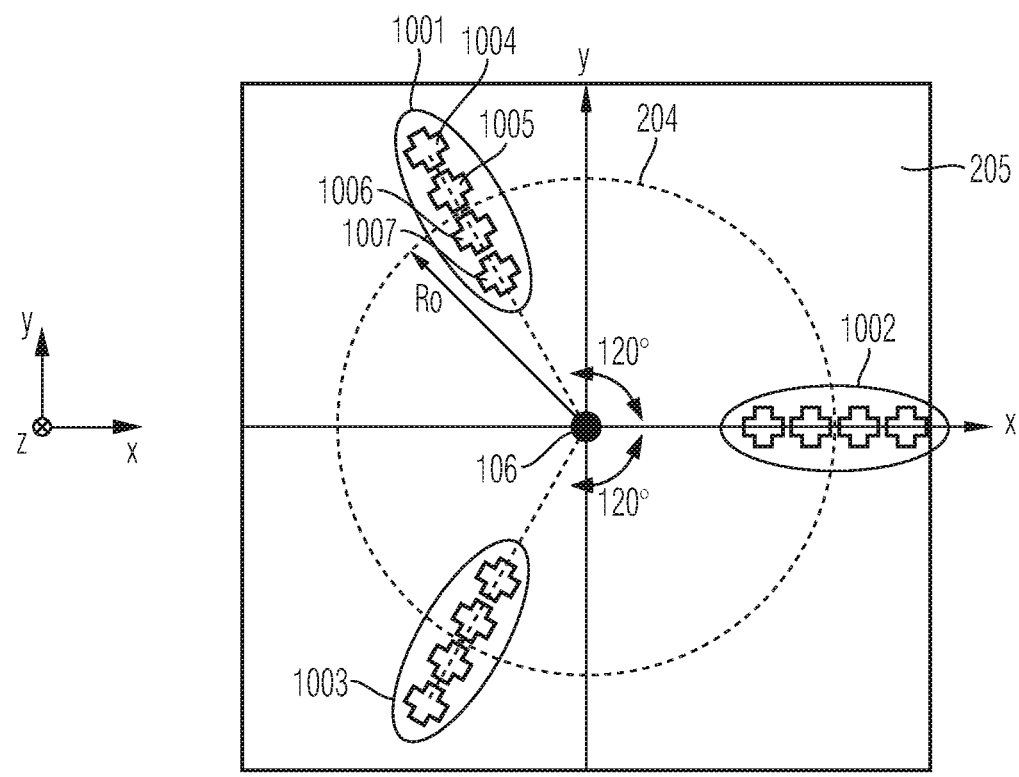
FIG. 10 shows an example arrangement of three magnetic sensing devices that are located on the reading circle, wherein each of the magnetic sensing devices comprises four magnetic sensing elements that are arranged on a straight line substantially perpendicular to a tangent of the reading circle.

FIG. 10 shows an arrangement comprising three magnetic sensing devices 1001 to 1003, wherein each magnetic sensing device comprises four magnetic sensing elements that are arranged on a straight line. This straight line is arranged perpendicular to the tangent that touches the reading circle 204 such that the center of gravity of the respective magnetic sensing device 1001 to 1003 (or the middle of the four magnetic sensor elements) touches the reading circle 204.

The magnetic sensing devices 1001 to 1003 are placed on the silicon die 205. The centers of gravity of the magnetic sensing devices 1001 to 1003 are equally distributed on the reading circle 204.

The magnetic sensing device 1001 comprises the magnetic sensing elements 1004 to 1007, wherein the centers of the magnetic sensing elements 1004 to 1007 are arranged on a straight line and the magnetic sensing elements 1004 to 1007 have the same orientation (rotation). This applies accordingly for each set of magnetic sensor elements per magnetic sensor device 1002 and 1003.

The magnetic sensor elements 1004 to 1007 of the magnetic sensor device 1001 are rotated by 120° against the magnetic sensor elements of the magnetic sensor device 1002 and the magnetic sensor elements of the magnetic sensor device 1003 are rotated by 240° against the magnetic sensor elements of the magnetic sensor device 1002.

Figure 11:
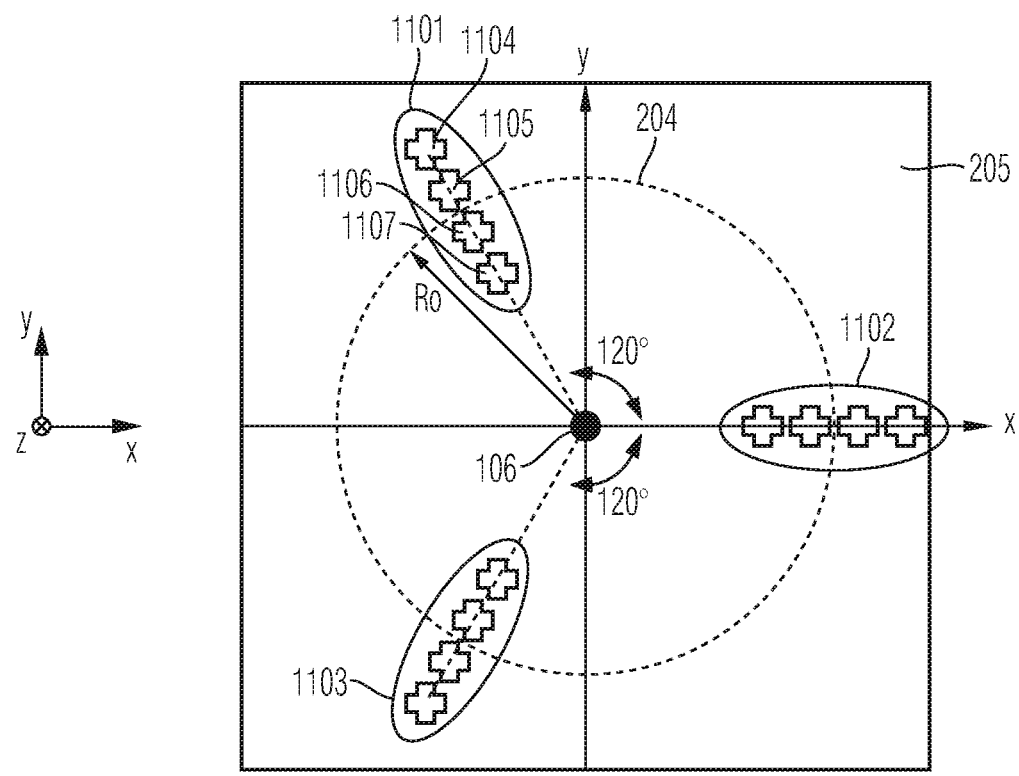
FIG. 11 shows an alternative arrangement compared to the one shown in FIG. 10, wherein the magnetic sensing elements of all magnetic sensing devices have the same orientation (and rotation)

FIG. 11 shows an arrangement comprising three magnetic sensing devices 1101 to 1103, wherein each magnetic sensing device comprises four magnetic sensing elements that are arranged on a straight line. This straight line is arranged perpendicular to the tangent that touches the reading circle 204 such that the center of gravity of the respective magnetic sensing device 1101 to 1103 (or the middle of the four magnetic sensor elements) touches the reading circle 204.

The magnetic sensing devices 1101 to 1103 are placed on the silicon die 205. The centers of gravity of the magnetic sensing devices 1101 to 1103 are equally distributed on the reading circle 204.

The magnetic sensing device 1101 comprises the magnetic sensing elements 1104 to 1107, wherein the centers of the magnetic sensing elements 1104 to 1107 are arranged on a straight line and the magnetic sensing elements 1104 to 1107 have the same orientation (rotation). In contrast to the embodiment shown in FIG. 10, the magnetic sensing elements of all magnetic sensing devices 1101 to 1103 have the same orientation and do not show any rotation between each other. In the example of FIG. 11, the reading directions (that indicate possible current flow directions) of all magnetic sensing elements are in parallel to the x-axis and the y-axis.

The embodiments above exemplarily show four magnetic sensor elements per magnetic sensor device. It is also an option that, e.g., two or more than four magnetic sensor elements are used per magnetic sensor device.

Embodiments described herein may in particular utilize any kind of magnetic sensing element that is sensitive to the z-component of the magnetic field. For example, Hall plates or MAG-FETs can be used in combination with the layout topologies described herein.

Determining the Rotation (Angle)

The following shows how the rotation angle can be determined via three magnetic sensor devices. These magnetic sensor devices can be arranged as described above.

The angle φ can be determined in a system with three magnetic sensor devices at integer multiples of 120° as follows:

$$S(\varphi)=B_z(\varphi+0°)+B_z(\varphi+120°)\times\exp(2\pi i/3)+B_z(\varphi+240°)\times\exp(4\pi i/3),$$

wherein the z-component Bz of the magnetic field is measured in a coordinate system that is fixed to the magnet.

The real part amounts to $$\mathrm{Re}\{S\} = B_z(0°) - \frac{B_z(120°) + B_z(240°)}{2}$$

and the imaginary part amounts to $$\mathrm{Im}\{S\} = \frac{\sqrt{3}}{2}(B_z(120°) - B_z(240°)).$$

Thus, the rotation angle φ is determined by $$\varphi=\arctan_2(\mathrm{Re}(S), \mathrm{Im}(S)).$$

It is noted that the arctan-function is not without ambiguity across 360°. The arctan-function ranges only from −90° to +90°. In the examples used, a range from −180° to +180° may be preferable. This can be achieved via the function $\arctan_2(x,y)$, which is identical with the $\arctan(y/x)$ if $x \geq 0$. However, if $x<0$, the following applies:

$$\arctan_2(x, y) = \arctan\frac{y}{x} - \pi,$$

which is indicated in radians (rad).

The solution presented is particularly robust against $3^{rd}$ and $5^{th}$ harmonics of the magnetic field thereby providing a stable way to determine the rotation angle.

The examples suggested herein may in particular be based on at least one of the following solutions. In particular combinations of the following features could be utilized in order to reach a desired result. The features of the method could be combined with any feature(s) of the device, apparatus or system or vice versa.

A magnetic angle sensing system is provide, comprising
a first magnetic sensing device,
a second magnetic sensing device,
a third magnetic sensing device,
a substrate comprising the first magnetic sensing device, the second magnetic sensing device and the third magnetic sensing device,
wherein the first magnetic sensing device, the second magnetic sensing device and the third magnetic sensing device are each arranged such to be responsive to a magnetic field component that is perpendicular to a main surface of the substrate,
wherein each or the first magnetic sensing device, the second magnetic sensing device and the third magnetic sensing device comprises the same number of magnetic sensing elements,
wherein the second magnetic sensing device is arranged on the semiconductor surface rotated by 120° in view of the first magnetic sensing device clockwise around a reference point,
wherein the third magnetic sensing device is arranged on the semiconductor surface rotated by 120° in view of the first magnetic sensing device counter-clockwise around the reference point.

It is noted that the magnetic sensing device may be arranged on the substrate. The substrate may in particular be a semiconductor substrate, being or comprising a silicon (semiconductor) chip or a die.

According to an embodiment, the reference point is located on a surface of the semiconductor device, wherein the reference point also lies on a rotation axis of a magnetic field source that is fixed to a rotatable shaft.

The angle sensing system is arranged to detect a rotation angle of this rotatable shaft.

According to an embodiment,
the second magnetic sensing device is arranged on the semiconductor surface, wherein its center of gravity is rotated by 120° in view of the center of gravity of the first magnetic sensing device clockwise around the reference point and
the third magnetic sensing device is arranged on the semiconductor surface, wherein its center of gravity is rotated by 120° in view of the center of gravity of the first magnetic sensing device counter-clockwise around the reference point.

According to an embodiment, the magnetic sensing elements of the magnetic sensing devices are rotated the same way as their associated magnetic sensing device.

According to an embodiment, several magnetic sensing elements of several magnetic sensing devices show the same orientation and rotation.

Hence, all magnetic sensing elements of the several magnetic sensing devices may be parallel to each other.

According to an embodiment, the magnetic sensing elements are at least one of the following: a Hall-plate or a MAG-FET.

According to an embodiment, each of the magnetic sensing devices comprises one magnetic sensing element, two magnetic sensing elements or four magnetic sensing elements.

According to an embodiment, the magnetic sensing elements of a magnetic sensing device are arranged in a rectangular shape, on a straight line or on a reading circle.

According to an embodiment, the magnetic sensing elements of each magnetic sensing device are connected via an interconnect layer in parallel.

Hence, the input-resistance or the output-resistance of the entire group of magnetic sensing elements is not larger than the respective input-resistance or output-resistance of a single magnetic sensing element.

Also, an angle sensor detection system is suggested
comprising a plurality of magnetic sensing devices that are arranged on a substrate, wherein each of the magnetic sensing devices is susceptible to sensing a magnetic field component that is perpendicular to the main surface of the substrate,
wherein the plurality of magnetic sensing devices are arranged on a reading circle at three different and equidistant locations,
wherein azimuthal coordinates of the magnetic sensing devices differ by 120° from each other,
comprising a processing unit that is arranged to
determining a first signal that is proportional to a difference of the magnetic field components provided by the first magnetic sensing device and the second magnetic sensing device,
determining a second signal that is proportional to a difference of the magnetic field components provided by the second magnetic sensing device and the third magnetic sensing device,
determining a rotation angle based on the first signal and the second signal.

Said processing unit may comprise at least one of the following: a processor, a microcontroller, a hard-wired circuit, an ASIC, an FPGA, a logic device.

According to an embodiment, the processing unit is further arranged to
determining a third signal that is proportional to a difference of the magnetic field components provided by the third magnetic sensing device and the first magnetic sensing device,
determining the rotation angle based on the first signal, the second signal and the third signal.

According to an embodiment, the magnetic field component sensed by the magnetic sensing devices is parallel to a rotation axis, wherein a shaft is arranged rotatably around the rotation axis and wherein a magnetic field source is connected to the shaft.

The shaft and in particular the magnet may be arranged in the vicinity of the plurality of magnetic sensing devices.

According to an embodiment, determining the rotation angle further comprises the following steps:
determining the rotation angle from a pointer in a (Sx, Sy)-plane, wherein Sx is a coordinate that is proportional to the first signal and wherein Sy is a coordinate that is proportional to a weighted sum of the second signal and the third signal,
wherein the rotation angle is an angle between the pointer and a direction along the Sx-coordinate or a direction along the Sy-coordinates.

It is noted that the weighted sum may also be a difference. This applies in particular in case the coefficients are equal according to their amount, but have different algebraic signs.

According to an embodiment, the rotation angle is an angle between the pointer and the direction along the Sx- or Sy-coordinates plus an arbitrary constant.

The arbitrary constant may be used to adjust the zero position. The arbitrary constant may amount to 23°, 90° or 180°.

Also, a method for determining a rotation angle of a shaft is provided,
wherein the shaft is arranged rotatably around a rotation axis and wherein a magnetic field source is connected to the shaft,
comprising a plurality of magnetic sensing devices that are arranged on a substrate, wherein each of the magnetic sensing devices is susceptible to sensing a magnetic field component of the magnetic field source that is perpendicular to the main surface of the substrate,
wherein the plurality of magnetic sensing devices are arranged on a reading circle at three different and equidistant locations,
wherein azimuthal coordinates of the magnetic sensing devices differ by 120° from each other,
the method comprising the steps:
determining a first signal that is proportional to a difference of the magnetic field components provided by the first magnetic sensing device and the second magnetic sensing device,
determining a second signal that is proportional to a difference of the magnetic field components provided by the second magnetic sensing device and the third magnetic sensing device,
determining a rotation angle based on the first signal and the second signal.

According to an embodiment, the method further comprises:
determining a third signal that is proportional to a difference of the magnetic field components provided by the third magnetic sensing device and the first magnetic sensing device,
determining the rotation angle based on the first signal, the second signal and the third signal.

A computer program product is suggested, which is directly loadable into a memory of a digital processing device, and which comprises software code portions for performing the steps of the method as described herein.

A computer-readable medium is provide, which has computer-executable instructions adapted to cause a computer system to perform the steps of the method as described herein.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various example embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A magnetic angle sensing system comprising:
a first magnetic sensing device,
a second magnetic sensing device,
a third magnetic sensing device,
a substrate comprising the first magnetic sensing device, the second magnetic sensing device, and the third magnetic sensing device,
wherein the first magnetic sensing device, the second magnetic sensing device, and the third magnetic sensing device are each arranged to be responsive to a magnetic field component that is perpendicular to a main surface of the substrate,
wherein each of the first magnetic sensing device, the second magnetic sensing device, and the third magnetic sensing device comprises a same quantity of magnetic sensing elements,
wherein the magnetic sensing elements are oriented on the substrate to have a first reading direction that is in parallel to each other,
wherein the magnetic sensing elements are oriented on the substrate to have a second reading direction that is in parallel to each other,
wherein the first reading direction is perpendicular to the second reading direction,
wherein the second magnetic sensing device is arranged on the main surface rotated by 120° in view of the first magnetic sensing device clockwise around a reference point, and
wherein the third magnetic sensing device is arranged on the main surface rotated by 120° in view of the first magnetic sensing device counter-clockwise around the reference point, and
a processing unit that is configured to:
determine a first signal that is proportional to a difference of the magnetic field component as sensed by the first magnetic sensing device and the magnetic field component as sensed by the second magnetic sensing device,
determine a second signal that is proportional to a difference of the magnetic field component as sensed by the second magnetic sensing device and the magnetic field component as sensed by the third magnetic sensing device, and
determine a rotation angle based on the first signal and the second signal.

2. The magnetic angle sensing system according to claim 1, wherein the reference point is located on a surface of a semiconductor device, and
wherein the reference point lies on a rotation axis of a magnetic field source that is fixed to a rotatable shaft.

3. The magnetic angle sensing system according to claim 1, wherein a center of gravity, of the second magnetic sensing device, is rotated by 120° in view of a center of gravity of the first magnetic sensing device clockwise around the reference point, and
wherein a center of gravity, of the third magnetic sensing device, is rotated by 120° in view of the center of gravity of the first magnetic sensing device counter-clockwise around the reference point.

4. The magnetic angle sensing system according to claim 1, wherein first magnetic sensing elements, of the first magnetic sensing device, are rotated by 120° in view of second magnetic sensing elements of the second magnetic sensing device around the reference point.

5. The magnetic angle sensing system according to claim 1, wherein each of the magnetic sensing elements are one of:
   a Hall-plate, or
   a MAG-FET.

6. The magnetic angle sensing system according to claim 1, wherein each of the first magnetic sensing device, the second magnetic sensing device, and the third magnetic sensing device comprises one magnetic sensing element, two magnetic sensing elements, or four magnetic sensing elements.

7. The magnetic angle sensing system according to claim 1, wherein first magnetic sensing elements, of the first magnetic sensing device, second magnetic sensing elements of the second magnetic sensing device, and third magnetic sensing elements of the third magnetic sensing device, are arranged in a rectangular shape, on a straight line, or on a reading circle.

8. The magnetic angle sensing system according to claim 1, wherein first magnetic sensing elements of the first magnetic sensing device are connected via a first interconnect layer in parallel, second magnetic sensing elements of the second magnetic sensing device are connected via a second interconnect layer in parallel, and third magnetic sensing elements of the third magnetic sensing device; are connected via a third interconnect layer in parallel.

9. An angle sensor detection system comprising:
   a plurality of magnetic sensing devices that are arranged on a substrate,
   wherein each of the plurality of magnetic sensing devices comprises one or more magnetic sensing elements,
   wherein the plurality of magnetic sensing devices are oriented on the substrate to have a first reading direction that is in parallel to each other,
   wherein the plurality of magnetic sensing devices are oriented on the substrate to have a second reading direction that is in parallel to each other,
   wherein the first reading direction is perpendicular to the second reading direction,
   wherein each of the plurality of magnetic sensing devices is susceptible to sensing a magnetic field component that is perpendicular to a surface of the substrate,
   wherein the plurality of magnetic sensing devices are arranged on a reading circle at three different and equidistant locations, and
   wherein azimuthal coordinates of the plurality of magnetic sensing devices differ by 120° from each other, and
a processing unit that is configured to:
   determine a first signal that is proportional to a difference of the magnetic field component as sensed by a first magnetic sensing device, of the plurality of magnetic sensing devices, and the magnetic field component as sensed by a second magnetic sensing device of the plurality of magnetic sensing devices,
   determine a second signal that is proportional to a difference of the magnetic field component as sensed by the second magnetic sensing device and the magnetic field component as sensed by a third magnetic sensing device of the plurality of magnetic sensing devices, and
   determine a rotation angle based on the first signal and the second signal.

10. The angle sensor detection system according to claim 9, wherein the processing unit is further configured to:
   determine a third signal that is proportional to a difference of the magnetic field component as sensed by the third magnetic sensing device and the magnetic field component as sensed by the first magnetic sensing device, and
   wherein the processing unit, when determining the rotation angle, is configured to:
   determine the rotation angle based on the first signal, the second signal, and the third signal.

11. The angle sensor detection system according to claim 9, wherein the magnetic field component is parallel to a rotation axis,
   wherein a shaft is arranged rotatably around the rotation axis, and
   wherein a magnetic field source is connected to the shaft.

12. The angle sensor detection system according to claim 10, wherein, when determining the rotation angle, the processing unit is configured to:
   determine the rotation angle from a pointer in a (Sx,Sy)-plane,
      wherein an Sx-coordinate is proportional to the first signal,
      wherein an Sy-coordinate is proportional to a weighted sum of the second signal and the third signal, and
      wherein the rotation angle is an angle between the pointer and a direction along the Sx-coordinate or a direction along the Sy-coordinate.

13. The angle sensor detection system according to claim 12, wherein the rotation angle is an angle between the pointer and the direction along the Sx-coordinate or the Sy-coordinate plus an arbitrary constant.

14. The angle sensor detection system according to claim 9, wherein each of the magnetic sensing devices have a rectangular, quadratic, crosswise, round, octagonal, or clover-leave shape.

15. The angle sensor detection system according to claim 9, wherein each magnetic sensing element of the first magnetic sensing device is electrically connected in parallel,
   wherein each magnetic sensing element of the second magnetic sensing device is electrically connected in parallel, and
   wherein each magnetic sensing element of the third magnetic sensing device is electrically connected in parallel.

16. The angle sensor detection system according to claim 9, wherein a first arrangement of one or more first magnetic sensing elements of the first magnetic sensing device is identical to a second arrangement of one or more second magnetic sensing elements of the second magnetic sensing device, and
   wherein the first arrangement and the second arrangement are identical to a third arrangement of one or more third magnetic sensing elements of the third magnetic sensing device.

17. The angle sensor detection system according to claim 9, wherein a first arrangement of one or more first magnetic sensing elements of the first magnetic sensing device is rotated by 120° with respect to a second arrangement of one or more second magnetic sensing elements of the second magnetic sensing device, and
   wherein the second arrangement is rotated by 240° with respect to a third arrangement of one or more third magnetic sensing elements of the third magnetic sensing device.

18. A method for determining a rotation angle of a shaft, comprising:
   determining, by a processor of an angle sensing system, a first signal that is proportional to a difference of a magnetic field component as provided by a first magnetic sensing device, of a plurality of magnetic sensing devices, and the magnetic field component as provided by a second magnetic sensing device of the plurality of magnetic sensing devices, wherein the angle sensing system comprises the plurality of magnetic sensing devices that are arranged on a substrate, wherein each of the plurality of magnetic sensing devices comprises one or more magnetic sensing elements, wherein the plurality of magnetic sensing devices are oriented on the substrate to have a first reading direction that is in parallel to each other, wherein the plurality of magnetic sensing devices are oriented on the substrate to have a second reading direction that is in parallel to each other, wherein the first reading direction is perpendicular to the second reading direction, wherein each of the plurality of magnetic sensing devices is susceptible to sensing the magnetic field component, wherein the magnetic field component is perpendicular to a surface of the substrate, wherein the plurality of magnetic sensing devices are arranged on a reading circle at three different and equidistant locations, and wherein azimuthal coordinates of the plurality of magnetic sensing devices differ by 120° from each other, determining, by the processor, a second signal that is proportional to a difference of the magnetic field component as provided by the second magnetic sensing device and the magnetic field component as provided by a third magnetic sensing device of the plurality of magnetic sensing devices, and determining, by the processor, a rotation angle based on the first signal and the second signal, wherein the shaft is arranged rotatably around a rotation axis, and wherein a magnetic field source is connected to the shaft.

19. The method according to claim 18, further comprising:

determining a third signal that is proportional to a difference of the magnetic field component as provided by the third magnetic sensing device and the magnetic field component as provided by the first magnetic sensing device, and wherein determining the rotation angle comprises:

determining the rotation angle based on the first signal, the second signal, and the third signal.

20. The method according to claim 19, wherein determining the rotation angle comprises:

determining the rotation angle from a pointer in a (Sx, Sy)-plane, wherein an Sx-coordinate is proportional to the first signal, wherein an Sy-coordinate is proportional to a weighted sum of the second signal and the third signal, and wherein the rotation angle is an angle between the pointer and a direction along the Sx-coordinate or a direction along the Sy-coordinate.

* * * * *